US006287039B1

(12) United States Patent
Leconte et al.

(10) Patent No.: US 6,287,039 B1
(45) Date of Patent: Sep. 11, 2001

(54) SYSTEM FOR TEMPORARILY BLOCKING THE RELATIVE DISPLACEMENT OF TWO BODIES, FOLLOWING AT LEAST A PRESET DIRECTION

(75) Inventors: Sylvain Leconte, Montrabe; Gilles Orhon, Aubergenville, both of (FR)

(73) Assignee: Aerospatiale Societe Nationale Industrielle, Paris Cedex (FR)

( * ) Notice: Subject to any disclaimer, the term of this patent is extended or adjusted under 35 U.S.C. 154(b) by 0 days.

(21) Appl. No.: 09/194,157

(22) PCT Filed: May 21, 1997

(86) PCT No.: PCT/FR97/00887

§ 371 Date: Jul. 15, 1999

§ 102(e) Date: Jul. 15, 1999

(87) PCT Pub. No.: WO97/44243

PCT Pub. Date: Nov. 27, 1997

(30) Foreign Application Priority Data

May 22, 1996 (FR) .................................................. 96 06345

(51) Int. Cl.[7] ................................. F16B 1/00; B64G 1/64
(52) U.S. Cl. ............................. 403/2; 403/28; 244/158 R
(58) Field of Search .................................... 403/2, 24, 25, 403/28; 411/39, 909; 244/158 R, 131

(56) References Cited

U.S. PATENT DOCUMENTS

| 4,841,730 | * | 6/1989 | McDonald | ............................. 60/527 |
| 5,060,888 | * | 10/1991 | Vezain et al. | ..................... 244/158 R |
| 5,119,555 | * | 6/1992 | Johnson | .................................. 29/254 |
| 5,245,738 | | 9/1993 | Johnson . | |
| 5,248,233 | | 9/1993 | Webster . | |
| 5,312,152 | | 5/1994 | Woebkenberg, Jr. et al. . | |
| 5,621,183 | * | 4/1997 | Bailey | ................................ 102/202.7 |
| 5,702,069 | * | 12/1997 | Geyer et al. | .................. 244/158 R X |
| 5,829,253 | * | 11/1998 | Long et al. | ....................... 411/909 X |
| 5,960,812 | * | 10/1999 | Johnson | ............................. 137/68.14 |

FOREIGN PATENT DOCUMENTS 0 699 580 A1    3/1996   (EP) .

OTHER PUBLICATIONS

*Cryogenics*, vol. 34, No. 5, May 1994, entitled "Novel orbital disconnect support for cryogenic tanks" by A. Seidel et al., pp. 389–392.

* cited by examiner

Primary Examiner—Harry C. Kim
(74) Attorney, Agent, or Firm—Crowell & Moring LLP

(57) ABSTRACT

The blocking system comprises a first interface element adapted to cooperate with a first of two bodies; a second interface element adapted to cooperate with the second of the two bodies; blocking element adapted to cooperate with the interface elements to ensure temporary blocking and comprising a frangible zone; a rupture device consisting of a shape memory alloy adapted to be deformed by elongation through heating to break the frangible zone, by which the second body becomes free to move relative to the first body; and heating element adapted to heat the rupture device beyond the critical temperature to cause the shape memory alloy to be deformed. A redundancy of heating element may be provided, as well as a retraction of at least part of the blocking element in a housing defined by one of the interface elements. The invention is useful for blocking the displacement of a tilting platform with respect to a fixed platform in the field of space applications.

42 Claims, 2 Drawing Sheets

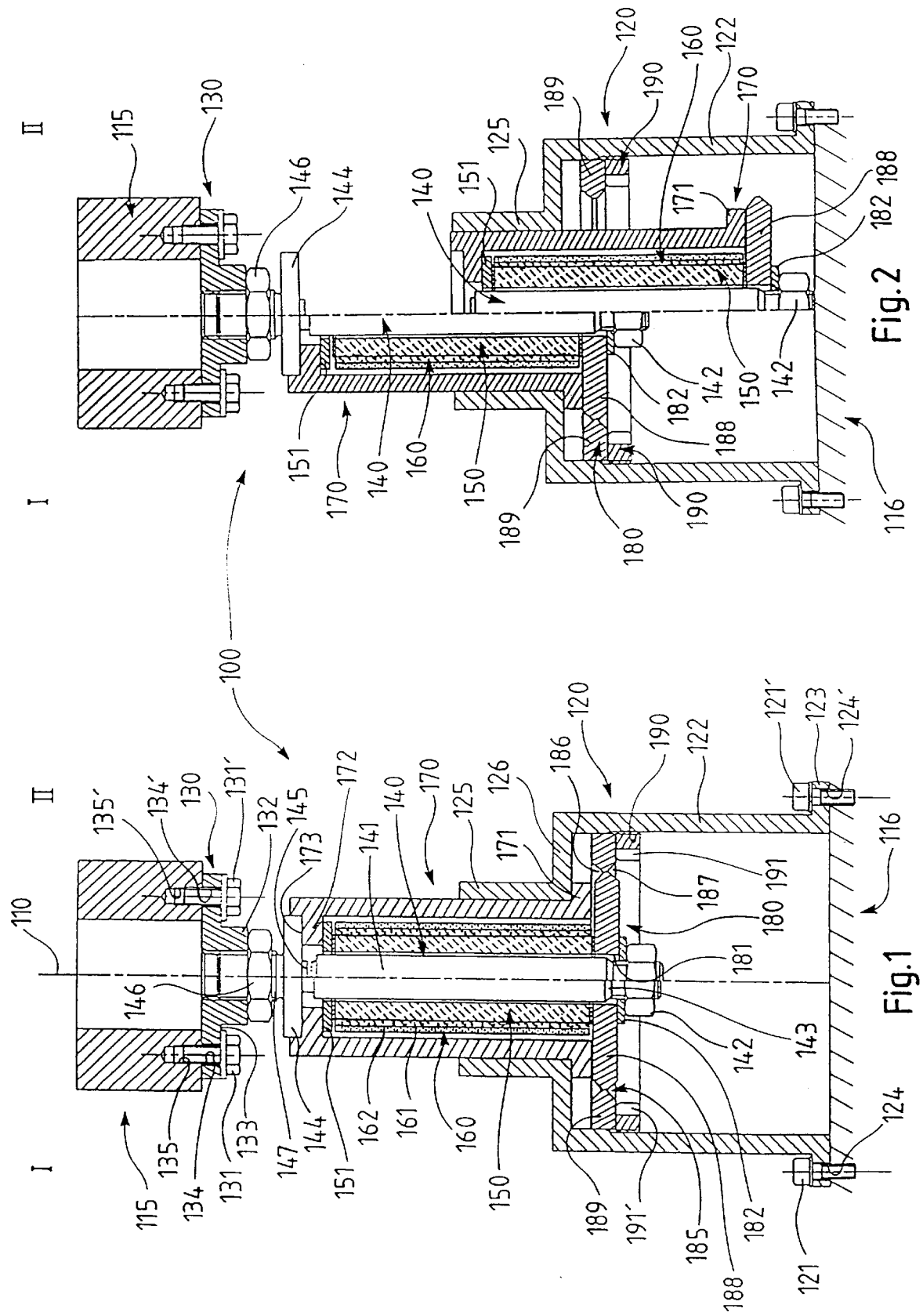

SYSTEM FOR TEMPORARILY BLOCKING THE RELATIVE DISPLACEMENT OF TWO BODIES, FOLLOWING AT LEAST A PRESET DIRECTION

BACKGROUND AND SUMMARY OF THE INVENTION

The present invention concerns a system for temporarily immobilizing two bodies relative to each other in at least one predetermined direction and, in particular, an immobilizing system which, when released, allows movement of great amplitude of one body relative to the other.

To be more precise, in certain fields such as placing satellites in orbit it is generally necessary to immobilize certain elements during launch and to restore their freedom of movement when in orbit. This applies in particular to tilting plates which, when in orbit, must have their facility for angular relative movement of great amplitude restored.

The use of jacks for this purpose has been considered. In addition to the facility of moving the plate relative to a fixed support, such as a fixed plate, jacks could also be used to immobilize the plate relative to the support during launch.

However, in the space field the skilled person is reluctant to use jacks, mainly for reasons of reliability.

Should a jack fail it is particularly difficult to carry out any repair or to use a back-up jack.

The above type of jack is also relatively bulky, in particular when it is necessary for the mobile plate to have a large range of relative angular movement.

The present invention aims to mitigate these drawbacks.

To this end it proposes a system for temporarily immobilizing two bodies relative to each other at least one way in a predetermined direction characterized in that it includes:
   a first interface part adapted to cooperate with a first body;
   a second interface part adapted to cooperate with a second body;
   an immobilizing device adapted to cooperate with the interface parts to assure the temporary immobilization, and including a rupture area;
   a rupture member made of a shape memory alloy adapted to deform when heated to rupture the rupture area to free the second body to move relative to the first body; and
   heating device adapted to heat said rupture member above a critical temperature to cause the shape memory alloy to deform.

An immobilizing system of the above type is particularly reliable because the release of one body relative to the other is obtained by the action of the rupture member made of shape memory alloy. The only possible failure is that of the heating device, for which redundancy is particularly simple to provide.

For simplicity and convenience the rupture member is adapted to deform by expanding in the direction when heated.

In a preferred embodiment, the rupture member is disposed between two abutments transverse to the direction so that the rupture member, when it expands, loads the abutments in the direction tending to rupture the rupture area.

In accordance with one particularly advantageous aspect of the present invention, one interface part has a housing receiving a part of at least one of the immobilizing device, the immobilizing device being mounted at one end on the interface part with the receiving housing, moving between an immobilizing position before the rupture area ruptures in which said immobilizing device projects partially from the receiving housing and a retracted position within the receiving housing after the rupture area ruptures.

Because of the above features, after the rupture area ruptures, the second body is not only released relative to the first body but also has a great amplitude of movement relative to it by virtue of the retraction of the immobilizing device within the housing receiving the first interface part.

Retraction can be effected by gravity or, in an application that is advantageous in the space field, by release of potential energy, in particular by means of a spring return member.

In accordance with other preferred features, which an possibly be combined:
   one of the abutments transverse to said direction includes a plate extending in the receiving housing, transversely to said direction, in that said rupture area comprises a continuous thinner area of the plate defining an internal area against which abuts a longitudinal end of the rupture member and a peripheral area, said plate being supported in said receiving housing, in said immobilizing position, by the peripheral area;
   said immobilizing device further comprise a rod extending in said direction, said plate having a circular opening through which said rod passes, said rod having a screwthreaded end engaged in said opening, and a nut mounted on said screwthread, abutting against said plate.
   the other interface part is attached to said rod and has an abutment surface constituting the other transverse abutment against which abuts the second longitudinal end of the rupture member;
   the rod has a transverse plate in the vicinity of its end opposite said screwthreaded end, said transverse plate having an abutment surface constituting the other transverse abutment against which abuts the other longitudinal end of the rupture member, and a smooth part at said opposite end on which is engaged a circular opening in the other interface part;
   the receiving housing is delimited by a cylindrical wall having a shoulder transverse to the longitudinal-axis of said wall, said direction being coaxial with said axis, the holding system further comprising a tubular member received in the receiving housing and having an external annular abutment at one longitudinal end adapted to cooperate axially with said shoulder and an internal annular rim in the vicinity of its other longitudinal end, said rupture member consisting of a sleeve surrounding said rod, said rupture member and said rod being received in said tubular member so that said rupture member, when it deforms, abuts against said transverse plate and against said internal annular rim, said external annular abutment being, in the immobilizing position, clamped between the transverse plate and the shoulder on the tubular member;
   the rod also has a second transverse plate in the vicinity of its end opposite said screwthreaded end, the second transverse plate being adapted to abut against the internal annular rim of the tubular member on one side, the rod further having, in the vicinity of that side, a significant reduction in diameter constituting a second transverse rupture area and, in the vicinity of the other side, a screwthreaded second longitudinal end with which is engaged a screwthread of the other interface part;
   the heating device include a heating coil around said sleeve;

the heating device include a second heating coil, the heating device being adapted to heat the rupture member by means of the second coil in the event of failure of said heating coil;

said transverse plate is supported in said receiving housing by means of a rim having an external screwthread engaging a screwthread on the cylindrical wall of the housing;

the spring return member includes at least one Coll spring disposed laterally between the tubular member and the cylindrical wall, said spring abutting longitudinally against the external annular abutment on the tubular member on the side of said abutment opposite that bearing against the transverse plate and against a wall of a lug housing the spring, transverse to the longitudinal axis;

each of the interface parts is bolted to the corresponding body.

BRIEF DESCRIPTION OF THE DRAWINGS

Aims, features and advantages of the invention will merge from the following description given by way of non-limiting example with reference to the accompanying drawings, in which:

FIGS. 1 and 2 are sectional elevation views of an embodiment of an immobilizing system in accordance with the invention;

DETAILED DESCRIPTION OF THE DRAWINGS

Figures 3, 4:
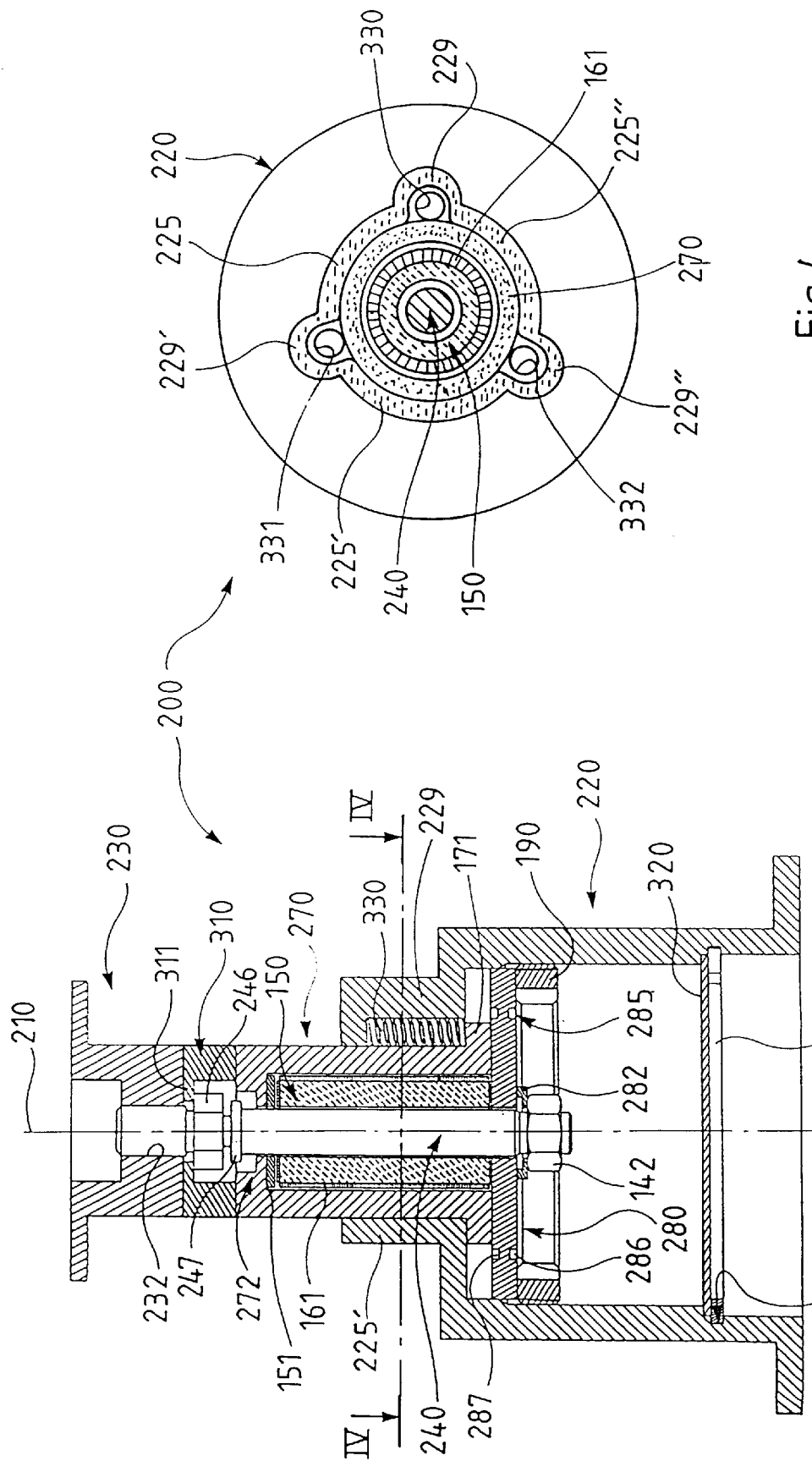
FIG. 3 is a sectional elevation view of another embodiment of an immobilizing system in accordance with the invention.
FIG. 4 is a view in cross-section taken along the line IV—IV in FIG. 3.

One embodiment of the temporary immobilization system in accordance with the present invention will now be described with reference to FIGS. 1 and 2.

It constitutes a system 100 for temporarily immobilizing two bodies relative to each other along both ways of a predetermined direction 110 that also constitutes he longitudinal axis of the temporary immobilizing system 100.

The two bodies are represented here by one end of a mobile plate 115 and by a fixing base 116, although the base could equally well be replaced by a fixed plate.

A first interface part 120 of the immobilizing system 100 is fixed to the base 116 by socket head bolts 121, 121' and a second interface part 130 of the immobilizing system 100 is fixed to the mobile plate 115 by hexagonal head bolts 131, 131'.

To this end the first interface part 120 has a first circular section cylinder portion 122 extended at one end by an annular rim 123 extending radially outwards and provided with openings 124, 124 through which the bolts 121, 121' pass.

The first cylinder portion 122 is joined to a second circular section cylinder portion 125 by an annular connector 126 extending radially inwards, i.e. transversely to and towards the axis 110. As a result, the second cylinder portion 125 has a smaller diameter than the first cylinder portion 122. Like the latter cylinder portion 122, the cylinder portion 125 extends parallel to the axis L10 of the immobilizing system 100 along part of its length.

The second interface part 130 is in the form of a screwthreaded bush 132 having an annular radial rim 133 at one end. Like the first interface part 120, this second interface part 130 is made in one piece. The annular rim 133 has openings 134, 134' through which the hexagonal head bolts 131, 131' pass, their bushes being inserted into the screwthreads 135, 135' in the mobile plate 115.

The screwthreaded bush 132 engages the screwthread on a rod 140 which is screwthreaded at both ends.

The rod 140 is coaxial with the axis 110 and its central part 141 is surrounded by a sleeve 150 made of a shape memory alloy the function of which will be explained in detail hereinafter and is itself surrounded by heating means 160—here comprising two heating coils 161, 162 the function of which will also be explained in detail hereinafter.

The rod 140, the sleeve 150 and the heating coil 161, 162 are concentrically disposed and received within a tubular member 170 which surrounds them in a concentric manner.

The second screwthreaded part of the rod 140 has a diameter slightly smaller than that of the central part 141 to which it is joined by a truncated cone 143.

The coils 161, 162 closely surround the sleeve 150, but there is some clearance between the coils 161, 162 and the tubular member 170.

The tubular member 170 is received in the housing delimited by the first cylinder portion 122, the second cylinder portion 125 and the annular connector 126. It has an outside diameter corresponding to the inside diameter of the second cylinder section 125 and a radial annular abutment 171 at one of its longitudinal ends. The external annular abutment 171 is clamped axially between the shoulder formed by the annular connector 126 and a plate 180 extending transversely to the axis 110 within the first cylinder portion 122.

The transverse plate 180 is mounted in the first cylinder portion 122 and causes the external annular abutment 171 to cooperate axially with the shoulder formed by the annular connector 126 via an externally screwthreaded ring 190 screwed into a screwthread formed in the wall of the first cylinder portion 122.

The ring 190 has cut-outs 191, 191' with which a corresponding wrench can be engaged to turn it.

The transverse plate 180 has a circular central opening 181 into which is inserted the end of the rod 140 opposite that with which the second interface part 130 engages. A nut 142 is fitted to the screwthreaded part of this enc of the rod 140 and is tightened against the plate 180 with a washer 182 between them.

The transverse plate 180 also includes a first axial rupture area 185 in the form of a reduced thickness portion of the plate 180. The reduction in its thickness is achieved by means of two V-shape circular grooves 186, 187 aligned with each other on respective opposite sides of the plate 180.

The continuous and thinner plate area 185 defines a disk-shape internal area 188 in contact with the external annular abutment 171 and a longitudinal end of the sleeve 150 and an annular peripheral area 189 in contact with the ring 190.

The other longitudinal end of the sleeve 150 abuts against a radial internal annular rim 172 of the tubular member 170 with a washer 151 between them.

The internal annular rim 172 is set back slightly relative to the corresponding free end of the tubular member 170 to define a spot face 173 against which a transverse plate 144 in one piece with the rod 140 can abut axially and radially.

Between the surface of the plate 144 that abuts against the spot face 173 and its central part 141, the rod 140 has a significantly reduced diameter constituting a transverse second rupture area 145.

A hexagonal nut 146 is fitted to the screwthread on the rod 140 receiving the second interface part 130 and gripped between the latter part 130 and a flange 147 on the rod 140.

The rod 140 and the transverse plate 180 are made from a frangible material.

The shape memory alloy constituting the sleeve 150 is a conventional shape memory alloy containing 50% nickel and 50% titanium with a critical deformation (here elongation) temperature of 70° C.

The sleeve 150 constitutes the rupture member defined above, the immobilizing means defined above essentially comprising the rod 140, the tubular member 170, the transverse plate 180, the ring 190 and the nut 142.

With regard to the means of heating the sleeve 150, only the heating coils 161, 162 are shown. The skilled person will know how to provide the appropriate electrical circuit to cause the coils 161, 162 to heat the sleeve 150 above the critical temperature causing it to deform. The coil 162 farther away from the sleeve 150 can take over from the first coil 161 should the latter fail.

With regard to the assembly of the immobilizing system 100, suffice to say that the hexagonal nut 146 is adapted to receive a wrench to prevent the rod 140 from turning when the nut 142 is tightened against the transverse plate 180.

The operation of the immobilizing system 100 will now be described.

In the lefthand half I of FIGS. 1 and 2 the immobilizing system 100 is shown in the immobilizing position in which the mobile plate 115 and the fixed plate 116 are prevented from moving either way along the predetermined direction 110.

Release is effected as follows.

The heating device is operated to heat the sleeve 150 above the critical temperature causing it to deform (expand).

When it expands, the sleeve 150 constitutes a rupture member because on the one hand it will apply an axial thrust to the transverse plate 180 and on the other hand it will apply an axial thrust to the internal annular rim 173 on the tubular member 170. Thus the rupture area 185 of the plate 180 is loaded by the rupture member 150 until it ruptures.

At the same time the rupture member 150 also applies thrust to the internal annular rim 173 and therefore to the plate 144 of the rod 140, and also to the rod 140 itself, while at the same time the transverse plate 180 loads the rod 140 in the opposite direction via the washer 182 and the nut 142.

The rod 140 is therefore loaded on both sides of the second rupture area 145 by forces in opposite directions, causing the second rupture area 145 to rupture.

By virtue of the above features, the rupture areas 185 and 145 rupture virtually simultaneously, or at least the area 145 ruptures before the area 185, given the loads exerted on the area 145. This prevents the first rupture area 185 from rupturing before the second rupture area 145, in which case retraction of tubular member 170 would entrain the mobile plate 115 with it. Rupture of the second rupture area 145 before the first rupture area 185 can occur because the rupture member 150 is still abutted against the internal annular rim 172 to rupture the first rupture area 185.

Following the above ruptures, the beginning of which is schematically represented in the right-hand half II of FIG. 1, gravity causes the tubular member 170 to slide, guided by the internal surface o the second cylinder section 125, to a position retracted within the first interface part 120, entraining the corresponding part of the rod 140 with the nut 142 and the washer 182, the sleeve 150, the coils 161 and 162 and the part 188 of the transverse part 180, which slide with it.

In the retracted position shown in the righthand half II of FIG. 2 the bottom end of the rod 140 abuts against the fixed base 116 and the sliding motion of the aforementioned members has opened up a large space which, after release, gives the end of the mobile plate 115 a large range of axial relative movement, or of angular relative movement if the plate 115 is a tilting plate.

Note that an immobilizing system 100 of the above kind, in particular through the use of two rupture areas and means for retracting part of the immobilizing means within one of the interface parts, immobilizes two bodies relative to each other both ways in a predetermined direction whilst, after release, offering a large range of axial relative movement in the predetermined direction 110 of one body relative to the other or, in the case of a tilting mobile plate 115, a large range of angular relative movement.

An immobilizing system of the above kind is also particularly reliable, in particular because of the redundancy of the heating device and the use of a rupture member made of a shape memory alloy, having the inherent characteristic of deforming a great deal over a very small range of temperatures, whereas below its critical deformation temperature it expands very little.

Furthermore, the immobilizing system is in the form of a pre-assembled assembly that can be fitted to the two bodies at the last moment.

It is of course possible to use a plurality of such immobilizing systems to immobilize two bodies relative to ~ch other.

In practice the structural characteristics of the immobilizing system are as follows:

| | |
|---|---|
| elongation of rupture member: | approx. 3% |
| retraction travel: | approx. 35 mm |
| length of rupture member 150: | approx. 40 mm |
| outside diameter of rupture member 150: | approx. 20 mm |
| outside diameter of tubular member 170: | approx. 34 mm |
| outside diameter of first cylinder section 122: | approx. 82 mm |

A second embodiment of an immobilizing system in accordance with the present invention will now be briefly described with reference to FIGS. 3 and 4.

It constitutes a system 200 for temporarily preventing motion one way only in a predetermined direction, namely movement downwards along the longitudinal axis 210 of the immobilizing system 200. In other words, the immobilizing system 200 is in fact a system for temporarily holding two bodies apart.

For this variant 200 of the immobilizing system shown in FIGS. 3 and 4, the same reference numbers are used as were used for the immobilizing system 100 of FIGS. 1 and 2, in the case of identical parts, whereas for similar parts the reference numbers have been increased by 100.

The immobilizing system 200 shown in FIGS. 3 and 4 differs mainly from that shown in FIGS. 1 and 2 in that the two interface parts 220 and 230 similar to those shown in FIGS. 1 and 2 merely bear against a corresponding body with no bolt fixing (the bodies concerned are not shown in the figures) and in that there is no second rupture area and no plate 144 on the rod 240, which simply has a hexagonal contour projection 246 in one piece with it and a flange 2~7 adapted to abut against an annular rim 272 of the tubular member 270.

What is more, replacing the second cylinder section 125, the first cylinder section 220 is extended by cylindrical wall sections 225, 225', 225" and by spring locating lugs 229, 229', 229". The lugs constitute housings for coil springs 330, 331, 332 which abut against a top transverse wall of the corresponding housing and against the external annular rim 171 on the tubular member 270 in order to spring load the tubular member and therefore the immobilizing means towards the retracted position.

Here three coil springs 330–332 and three locating lugs 229–229" linked circumferentially by the cylindrical wall sections 225–225" are used, the lugs and wall sections being in one piece with and axially extending the first cylinder portion 220.

The use of springs is particularly beneficial in the space field to supplement the effect of gravity by releasing potential energy.

What is more, the second interface part 230 is not screwed onto the rod 240, but simply engaged by means of a bore 232 on a smooth part of the rod 240 at one of its longitudinal ends.

The washer 182 is replaced by a washer 282 with an L-shape profile. The V-shape grooves 186, 187 are replaced by U-shape grooves 286, 287.

A cylindrical wedging part 310 having at one end an internal annular rim 311 which abuts against the second interface part 230 and against the projection 246 is disposed between the tubular member 270 and the second interface part 230 to assure continuity between the latter two components and to take up transverse forces when the immobilizing means move from the immobilizing position to the retracted position.

Here, the retracted position corresponds to the bottom end of the rod 240 abutting against an abutment plate 320 mounted transversely in the first interface part 220 by means of a circlip 321 engaging in a stepped groove 322.

Finally, there is only one heating coil 161, i.e. there is no back-up heating coil.

Operation is similar to that of the embodiment shown in FIGS. 1 and 2.

Rupture of the single rupture area 285 causes the immobilizing means at the second interface part 230 to move to the retracted position, enabling one of the bodies to move towards the other.

Clearly the second interface part 230 could also be attached to the corresponding second body.

The skilled person will also know how to adapt the features of the embodiments shown in FIGS. 1 and 2 that shown in FIGS. 3 and 4 and vice versa.

In other variants that are not shown, the top transverse abutment for the rupture member, rather than the internal annular rim of a tubular member, can comprise an abutment surface of the second interface part attached to the rod, or the plate 144 itself.

The skilled person will also know, on the basis of the foregoing teachings, how to produce an immobilizing system in which the rupture member shortens on heating or an immobilizing system simply comprising two interface parts each adapted to cooperate with one body and connected by a rod having a rupture area surrounded by a sleeve made of a shape memory alloy that abuts at each longitudinal end against a corresponding interface part.

As an alternative, another shape memory alloy could also be used as the rupture member, its critical temperature being chosen to suit the intended application.

One of the interface parts could also be an integral part of the corresponding body or the transverse plate 180, 280 could be an integral part of the rod 140, 240.

The immobilizing system of the present invention could equally be applied to temporarily suspending one body from another.

More generally, it should be remembered that the invention is not limited to the examples described and shown.

What is claimed is:

1. A system for temporarily immobilizing two bodies relative to each other at least one way in a predetermined direction, comprising:
    a first interface part adapted to cooperate with a first body;
    a second interface part adapted to cooperate with a second body,
    an immobilizing device having a rupture area and adapted to cooperate with the first and second interface parts to assure a temporary immobilization of the two bodies, wherein the two bodies are held apart by a first distance before the rupture area ruptures and are retracted toward each other immediately once the rupture area ruptures to enable relative movement of the two bodies, at least over part of said first distance;
    a rupture member made of a shape memory alloy adapted to deform when heated to rupture the rupture area; and
    a heating device adapted to heat said rupture member above a critical temperature to cause the shape memory alloy to deform.

2. An immobilizing system according to claim 1, wherein said rupture member is adapted to deform by expanding in said direction when heated.

3. An immobilizing system according to claim 2, wherein said rupture member is disposed between two abutments transverse to said direction so that the rupture member, when it expands, loads said abutments in the direction tending to rupture the rupture area.

4. An immobilizing system according to claim 3, wherein one of the first and second interface parts has a housing receiving a part of the immobilizing device, said immobilizing device being mounted at one end on the interface part with the receiving housing, moving between an immobilizing position before the rupture area ruptures in which said immobilizing device projects partially from the receiving housing and a position in which practically all of the immobilizing device is retracted within the receiving housing after the rupture area ruptures.

5. An immobilizing system according to claim 4, wherein one of the abutments transverse to said direction includes a plate extending in the receiving housing, transversely to said direction, and further wherein said rupture area comprises a continuous thinner area of the plate defining an internal area against which abuts a longitudinal end of the rupture member and a peripheral area, said plate being supported in said receiving housing, in said immobilizing position, by the peripheral area.

6. An immobilizing system according to claim 5, wherein said immobilizing device further comprises a rod extending in said direction, said plate having a circular opening through which said rod passes, said rod having a screwthreaded end engaged in said opening, and a nut mounted on said screwthread, abutting against said plate.

7. An immobilizing system according to claim 6, wherein the other interface part is attached to said rod and has an abutment surface constituting the other transverse abutment against which abuts the second longitudinal end of the rupture member.

8. An immobilizing system according to claim 6, wherein the rod has a transverse plate in the vicinity of its end opposite said screwthreaded end, said transverse plate having an abutment surface constituting the other transverse abutment against which abuts the other longitudinal end of the rupture member, and a smooth part at said opposite end on which is engaged a circular opening in the other interface part.

9. An immobilizing system according to claim 6, wherein the receiving housing is delimited by a cylindrical wall having a shoulder transverse to the longitudinal axis of said wall, said direction being coaxial with said axis, the immobilizing system further comprising a tubular member received in the receiving housing and having an external annular abutment at one longitudinal end adapted to cooperate axially with said shoulder and an internal annular rim in the vicinity of its other longitudinal end, said rupture member consisting of a sleeve surrounding said rod, said rupture member and said rod being received in said rupture member and said rod being received in said tubular member so that said rupture member, when it deforms, abuts against said transverse plate and against said internal annular rim, said external annular abutment being, in the immobilizing position, clamped between the transverse plate and the shoulder on the tubular member.

10. An immobilizing system according to claim 9, wherein the rod also has a second transverse plate in the vicinity of its end opposite said screwthreaded end, the second traverse plate being adapted to abut against the internal annular rim of the tubular member on one side, the rod further having, in the vicinity of that side, a significant reduction in diameter constituting a second transverse rupture area and, in the vicinity of the other side, a screwthreaded second longitudinal end with which is engaged a screwthread of the other interface part.

11. An immobilizing system according to claim 10, wherein the heating device includes a heating coil around said sleeve.

12. An immobilizing system according to claim 9, wherein the heating device includes a heating coil around said sleeve.

13. An immobilizing system according to claim 12, wherein the heating device includes a second heating coil, the heating device being adapted to heat the rupture member by the second coil in the event of failure of said heating coil.

14. An immobilizing system according to claim 9, wherein said transverse plate is supported in said receiving housing by a rim having an external screwthread engaging a screwthread on the cylindrical wall of the housing.

15. An immobilizing system according to claim 2, wherein one of said first and second interface parts has a housing receiving a part of the immobilizing device, said immobilizing device being mounted at one end on said one interface part with the receiving housing, moving between an immobilizing position before the rupture area ruptures in which said immobilizing device projects partially from the receiving housing and a position in which practically all of the immobilizing device is retracted within the receiving housing after the rupture area ruptures.

16. An immobilizing system according to claim 15, wherein the immobilizing device is moved to the retracted position by releasing potential energy.

17. An immobilizing system according to claim 16, wherein the immobilizing device is moved to the retracted position by a spring return member.

18. An immobilizing system according to claim 17, wherein the receiving housing is delimited by a cylindrical wall having a shoulder transverse to the longitudinal axis of said wall, said directon being coaxial with said axis, the immobilizing system further comprising a tubular member received in the receiving housing and having an external annular abutment at one longitudinal end adapted to cooperate axially with said shoulder and an internal annular rim in the vicinity of its other longitudinal end, said rupture member consisting of a sleeve surrounding said rod, said rupture member and said rod being received in said rupture member and said rod being received in said tubular member so that said rupture member, when it deforms, abuts against said transverse plate and against said internal annular rim, said external annular abutment being, in the immobilizing position, clamped between the transverse plate and the shoulder on the tubular member.

19. An immobilizing system according to claim 18, wherein the spring return member includes at least one coil spring disposed laterally between the tubular member and the cylindrical wall, said spring abutting longitudinally against the external annular abutment on the tubular member on the side of said abutment opposite that bearing against the traverse plate and against a wall of a lug housing the spring, transverse to the longitudinal axis.

20. An immobilizing system according to claim 15, wherein the immobilizing device is moved to the retracted position by the effect of gravity.

21. An immobilizing system according to claim 1, wherein each of the interface parts is bolted to the corresponding body.

22. A system for temporarily immobilizing two bodies relative to each other at least one way in a predetermined direction, comprising:
   a first interface part adapted to cooperate with a first body;
   a second interface part adapted to cooperate with a second body;
   an immobilizing device having a rupture area and adapted, on the one hand, to cooperate with the first and second interface parts to assure a temporary immobilization of the two bodies, wherein the two bodies are held apart by a first distance before the rupture area ruptures, and, on the other hand, to be retracted immediately once the rupture area ruptures to enable relative movement of the two bodies, at least over part of said first distance;
   a rupture member made of a shape memory alloy adapted to deform when heated to rupture the rupture area; and
   a heating device adapted to heat said rupture member above a critical temperature to cause the shape memory alloy to deform.

23. An immobilizing system according to claim 22, wherein said rupture member is adapted to deform by expanding in said direction when heated. direction, and further wherein said rupture area comprises a continuous thinner area of the plate defining an internal area against which abuts a longitudinal end of the rupture member and a peripheral area, said plate being supported in said receiving housing, in said immobilizing position, by the peripheral area.

24. An immobilizing system according to clam 23, wherein said rupture member is disposed between two abutments transverse to said direction so that the rupture member, when it expands, loads said abutments in the direction tending to rupture the rupture area.

25. An immobilizing system according to claim 24, wherein one of the first and second interface parts has a housing receiving a part of the immobilizing device, said immobilizing device being mounted at one end on the interface part with the receiving housing, moving between an immobilizing position before the rupture area ruptures in which said immobilizing device projects partially from the receiving housing and a position in which practically all of the immobilizing device is retracted within the receiving housing after the rupture area ruptures.

26. An immobilizing system according to claim 25, wherein one of the abutments transverse to said direction includes a plate extending in the receiving housing, transversely to said direction, and further wherein said rupture area comprises a continuous thinner area of the plate defining an internal area against which abuts a longitudinal end of the rupture member and a peripheral area, said plate being supported in said receiving housing, in said immobilizing position, by the peripheral area.

27. An immobilizing system according to claim 26, wherein said immobilizing device further comprises a rod extending in said direction, said plate having a circular opening through which said rod passes, said rod having a screwthreaded end engaged in said opening, and a nut mounted on said screwthread, abutting against said plate.

28. An immobilizing system according to claim 27, wherein the other interface part is attached to said rod and has an abutment surface constituting the other transverse abutment against which abuts the second longitudinal end of the rupture member.

29. An immobilizing system according to claim 27, wherein the rod has a transverse plate in the vicinity of its end opposite said screwthreaded end, said transverse plate having an abutment surface constituting the other transverse abutment against which abuts the other longitudinal end of the rupture member, and a smooth part at said opposite end on which is engaged a circular opening in the other interface part.

30. An immobilizing system according to claim 27, wherein the receiving housing is delimited by a cylindrical wall having a shoulder transverse to the longitudinal axis of said wall, said direction being coaxial with said axis, the immobilizing system further comprising a tubular member received in the receiving housing and having an external annular abutment at one longitudinal end adapted to cooperate axially with said shoulder and an internal annular rim in the vicinity of its other longitudinal end, said rupture member consisting of a sleeve surrounding said rod, said rupture member and said rod being received in said rupture member and said rod being received in said tubular member so that said rupture member, when it deforms, abuts against said transverse plate and against said internal annular rim, said external annular abutment being, in the immobilizing position, clamped between the transverse plate and the shoulder on the tubular member.

31. An immobilizing system according to claim 30, wherein the rod also has a second transverse plate in the vicinity of its end opposite said screwthreaded end, the second traverse plate being adapted to abut against the internal annular rim of the tubular member on one side, the rod further having, in the vicinity of that side, a significant reduction in diameter constituting a second transverse rupture area and, in the vicinity of the other side, a screwthreaded second longitudinal end with which is engaged a screwthread of the other interface part.

32. An immobilizing system according to claim 31, wherein the heating device includes a heating coil around said sleeve.

33. An immobilizing system according to claim 30, wherein the heating device includes a heating coil around said sleeve.

34. An immobilizing system according to claim 33, wherein the heating device includes a second heating coil, the heating device being adapted to heat the rupture member by the second coil in the event of failure of said heating coil.

35. An immobilizing system according to claim 30, wherein said transverse plate is supported in said receiving housing by a rim having an external screwthread engaging a screwthread on the cylindrical wall of the housing.

36. An immobilizing system according to claim 23, wherein one of said first and second interface parts has a housing receiving a part of the immobilizing device, said immobilizing device being mounted at one end on said one interface part with the receiving housing, moving between an immobilizing position before the rupture area ruptures in which said immobilizing device projects partially from the receiving housing and a position in which practically all of the immobilizing device is retracted within the receiving housing after the rupture area ruptures.

37. An immobilizing system according to claim 36, wherein the immobilizing device is moved to the retracted position by releasing potential energy.

38. An immobilizing system according to claim 37, wherein the immobilizing device is moved to the retracted position by the effect of gravity.

39. An immobilizing system according to claim 37, wherein the immobilizing device is moved to the retracted position by a spring return member.

40. An immobilizing system according to claim 39, wherein the receiving housing is delimited by a cylindrical wall having a shoulder transverse to the longitudinal axis of said wall, said direction being coaxial with said axis, the immobilizing system further comprising a tubular member received in the receiving housing and having an external annular abutment at one longitudinal end adapted to cooperate axially with said shoulder and an internal annular rim in the vicinity of its other longitudinal end, said rupture member consisting of a sleeve surrounding said rod, said rupture member and said rod being received in said rupture member and said rod being received in said tubular member so that said rupture member, when it deforms, abuts against said transverse plate and against said internal annular rim, said external annular abutment being, in the immobilizing position, clamped between the transverse plate and the shoulder on the tubular member.

41. An immobilizing system according to claim 40, wherein the spring return member includes at least one coil spring disposed laterally between the tubular member and the cylindrical wall, said spring abutting longitudinally against the external annular abutment on the tubular member on the side of said abutment opposite that bearing against the traverse plate and against a wall of a lug housing the spring, transverse to the longitudinal axis.

42. An immobolizing system according to claim 22, wherein each of the interface parts is bolted to the corresponding body.

* * * * *